Patented Feb. 9, 1932

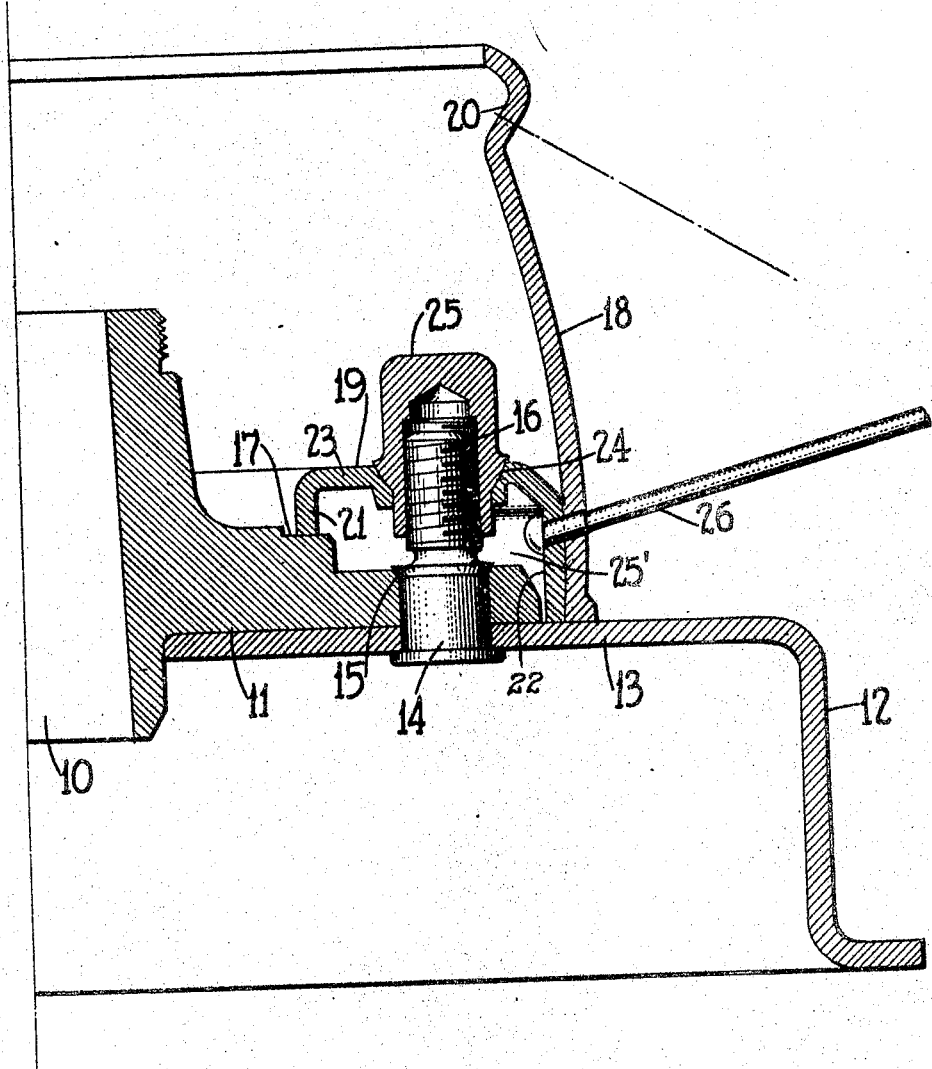

1,843,967

UNITED STATES PATENT OFFICE

RUSSELL S. BEGG, OF INDIANAPOLIS, INDIANA, ASSIGNOR TO BUDD WHEEL COMPANY, OF PHILADELPHIA, PENNSYLVANIA, A CORPORATION OF PENNSYLVANIA

HUB SHELL CONSTRUCTION

Application filed September 11, 1929. Serial No. 391,754.

This invention relates to wire wheel hub shells and more particularly to improvements in such shells which are adapted to be demountably secured to the usual wheel hub flange and which are interchangeable between front and rear hubs and with wood or disk wheels on the same hub.

The prime object of the invention is an arrangement of hub shell parts with respect to the hub flange which bears them such that adequate room may be had for spoke anchorages adjoining the inner end of the hub shell without increasing the internal diameter of the inner end materially beyond the external diameter of the hub flange. It has heretofore been customary to provide a general radial extension and outward flaring of the hub shells in this region. This is avoided by my invention.

Another object of the present invention is the provision of a hub shell of the character described which is not only simple in construction and economical to manufacture but which also provides for a strong spoke anchorage for those spokes which take the major torque and load strains.

A still further object of the invention is the provision of a wire wheel hub shell the component parts of which are of simple geometric design whereby the cost of fabricating the same is reduced to a minimum at the same time that the strength and efficiency thereof are increased to a maximum degree.

Still another object of the invention is to provide a hub shell of such design as to effectually preclude all possibility of the wheel from shifting or tilting out of axial coincidence with the supporting hub therefor. To this end, the shell comprises a main barrel member to which the wheel spokes are adapted to be anchored and an attaching member by means of which said barrel member is positionally secured upon the wheel hub. A distinguishing feature of the present construction resides in the fact that while one portion of the attaching member bears directly against the wheel hub flange another and spaced portion thereof, together with the inner end of the barrel member, bears against the brake drum, thereby insuring a more firm and secure foundation for the hub shell as a whole.

Other objects of the invention and advantages resulting therefrom will appear more fully from the detailed description to follow.

The invention consists substantially in the combination, construction, location and relative arrangement of parts, all of which will appear more fully hereinafter, as shown in the accompanying drawing, and as finally pointed out in the appended claims. In the said accompanying drawing the single figure is an axial section of the hub portion of a wheel showing the improved hub shell mounted thereon in accordance with the principles of the present invention.

Referring now more particularly to the drawing it will be observed that the improved hub shell construction is shown applied to a wheel hub 10 of the usual type and having a radial flange 11. Secured to the rear face of this hub flange 11 is a brake drum 12 the main body or web 13 of which is of substantially plane formation. In the instant showing, the brake drum is shown secured to the hub flange by a plurality of circumferentially spaced headed studs 14 each of which is provided with an upset shoulder 15 for locking the brake drum to the hub flange. As clearly appears in the figure each of the studs 14 is provided with a threaded shank 16 projecting outwardly of the hub flange 11 and in parallelism with the central axis of the hub. It will be observed that the outer surface of the hub flange is of stepped formation whereby to provide an annular bearing surface 17 lying in a plane disposed substantially at right angles to the central axis of the hub.

The hub shell proper as constructed in accordance with the present invention comprises a main barrel member 18 and an attaching member 19 for securing the hub shell to the wheel hub. The member 18 is of substantially cylindrical formation and is adapted to be readily formed out of sheet metal stock by simple rolling and pressing operations. The wall of this barrel member is curved longitudinally of the axis thereof so as to provide a somewhat larger diameter at the rear than at the front end, the minimum internal diameter thereof being such that it exceeds the diameter of the circle formed by the studs 14. The front or outer end of the barrel member 18 is provided with an annular divergent portion 20 constituting the anchorage zone for the inner ends of the outer set of spokes (not shown) which serve to brace the wheel against lateral thrusts.

The attaching member 19 is substantially in the form of an annular ring of substantially channel section, the inner wall 21 of which is of considerably less depth than the outer wall 22 thereof. Provided in the base wall 23 of this channeled ring 19 are a plurality of centrally apertured sockets 24 of substantially spherical formation through which the threaded shanks of the studs 14 are adapted to be projected. Ball-faced nuts 25, which are adapted to be respectively seated within the sockets 24, threadedly engage the studs 14 for securing the attaching member 19 in position. The attaching member, due to its simple geometric design may be readily fabricated out of rolled stock, bent into a circle and welded together after which it is pressed or otherwise worked into its final form.

It will be observed that the external diameter of the attaching member or ring 19 is such that it is adapted to be telescoped within the rear end of the barrel member 18, the relative position of these parts being shown in the drawing wherein it will be seen that the rear edge of the outer wall 22 of the member 19 terminates in the plane of the corresponding edge of the barrel member 18. In order to effect a permanent assembly between the members 18 and 19 the contacting surfaces thereof are preferably welded together, the proximate rear edges thereof being also securely united, preferably by arc welding. The portions thus welded together provide a rear anchorage zone of doubled thickness for the inner set of spokes (a portion of one of which is shown) which receive the major portion of the torque and load strains to which the wheel is subjected when in use.

It will be observed that the diameter of the outer wall 22 of the attaching member is greater than the overall diameter of the hub flange 11 and that the rear edge thereof, together with the corresponding edge of the barrel member 18 of the hub shell, is adapted to bear directly against the exposed external surface of the brake drum 12. The rear edge of the inner wall 21 of the attaching ring bears against the annular bearing surface 17 provided upon the frontal surface of the hub flange. By means of the construction just described a hub shell is provided which is not only compact in overall dimensions, strong and durable in use and neat in external appearance but which also provides for a very firm and substantial foundation for the hub shell, thereby insuring against axial misalignment between the wheel and its supporting hub.

But over and above the foregoing is secured the prime object of my invention, an axial rather than a radial extension of the hub shell 18 over the external diameter of the hub flange 11 and on a diameter not greatly exceeding the diameter of the hub flange whereby without increasing the diameter of the shell 18 within this region, there is provided a space 25' entirely adequate for the anchorage of spokes 26. Moreover, by reason of the bearing of the inner end of the hub shell 18 directly against the brake drum 13, it is unnecessary to increase the diameter of the hub flange 11 to secure such a bearing. Simplicity of construction, economy of materials in this region, and the feasibility of a very pleasing exterior design of hub shell 18 at once become correlative advantages.

The improved construction of hub shell as described herein not only lends itself readily to the concealment of the securing studs and nuts but it also permits convenient and ready access to the nuts when described. To this end the outer end of the barrel member 18, which is shown open in the drawing, may be closed by any suitable type of quick-detachable cover or name plate.

It will be understood, of course, that various changes in the invention may be made from time to time without departing from the real spirit or principles thereof and it is accordingly intended to claim the same broadly, as well as specifically, as indicated by the appended claims.

What is claimed as new and useful is:—

1. In a demountable wire wheel construction, in combination, a hub having a radially extending flange, a brake drum having a substantially flat main body portion adapted to be permanently secured flat-wise against the rear surface of said hub flange, a hub shell having spoke anchorage zones adjacent each end thereof, the diameter at the rear edge of said shell being greater than that of said hub flange whereby to permit said rear edge of the shell to abut the external surface of said brake drum main body, an attaching member for said shell telescopically received within the rear end thereof, said attaching member being in the form of an annulus having concentric outer and inner flanges, the outer of said flanges being in contacting engagement with and constituting a reinforcement for the spoke anchorage zone of the hub shell and the inner flange being seated against the frontal surface of the hub flange, and means demountably securing said hub shell to the hub of the vehicle.

2. In a demountable wire wheel construction, in combination, a hub therefor having a radial flange and a brake drum secured to the rear surface of said flange, the main body of said brake drum lying in a plane disposed substantially at right angles to the wheel axis and being extended beyond the circumferential edge of said hub flange, a hub shell, an attaching member for securing said shell in position upon said hub, said attaching member being in the form of an annulus having radially spaced concentric flanges the outer of which is of greater depth than the inner, said outer flange being in contacting engagement with the internal surface of said hub shell, the rear edges of said outer flange and of said hub shell commonly abutting the exposed surface of said brake drum main body and said inner and shorter flange of said attaching member abutting the frontal surface of said hub flange, and means demountably securing said hub shell to the hub of the vehicle.

3. In a demountable wire wheel hub shell, in combination, a pair of telescopically engaged members permanently secured together, the outer member being provided with spoke anchorage zones adjacent each end thereof and the inner member comprising an inner portion and a flanged portion constituting a reinforcement for one of said zones, said flanged portion forming said telescoping engagement with said outer member and both terminating in a common plane and being adapted to abut against the external surface of a brake drum secured to the hub, and means for securing said inner portion of said inner member directly to the hub, whereby to secure the wheel in place.

In testimony whereof he hereunto affixes his signature.

RUSSELL S. BEGG.